No. 737,855. PATENTED SEPT. 1, 1903.
W. T. McCRAY.
APPARATUS FOR PURIFYING GRAIN OR OTHER PRODUCTS.
APPLICATION FILED AUG. 3, 1901.
NO MODEL. 2 SHEETS—SHEET 2.

Witnesses:—
Carl W. Crawford
George R. Wilkins

Inventor:—
Warren T. McCray
by Poole & Brown
his Attorneys

No. 737,855. Patented September 1, 1903.

UNITED STATES PATENT OFFICE.

WARREN T. McCRAY, OF KENTLAND, INDIANA, ASSIGNOR TO AMERICAN GRAIN PURIFIER CONSTRUCTING COMPANY, OF PIERRE, SOUTH DAKOTA, A CORPORATION OF SOUTH DAKOTA.

APPARATUS FOR PURIFYING GRAIN OR OTHER PRODUCTS.

SPECIFICATION forming part of Letters Patent No. 737,855, dated September 1, 1903.

Application filed August 3, 1901. Serial No. 70,725. (No model.)

*To all whom it may concern:*

Be it known that I, WARREN T. MCCRAY, of Kentland, in the county of Newton and State of Indiana, have invented certain new and useful Improvements in Apparatus for Purifying Grain or other Products; and I do hereby declare that the following is a full, clear, and exact description thereof, reference being had to the accompanying drawings, and to the letters of reference marked thereon, which form a part of this specification.

This invention relates to an improved apparatus for purifying grains or other products by removing therefrom impurities clinging thereto—such as stains, mold, dirt, must, smut, and bacteria—which not only lessen the market value of the product by reason of discoloration thereof, but also injure the quality thereof, and which bacteria tends to destroy the germinating quality of the grain.

The apparatus herein shown has been devised as one means of carrying out an improved process of purifying grains or other products, as set forth in my copending application for United States Letters Patent, Serial No. 70,726, filed of even date herewith. Said process consists generally of passing the grain or other product through a chamber and subjecting said product while passing through the chamber to the action of the fumes of a purifying agent, such as sulfur, said purifying agent being heated to generate the fumes and being introduced into the chamber, together with a dampening agent, such as steam, whereby the product is dampened by the steam, which serves to loosen the investing coating of the foreign substances thereon, and the fumes thereafter attack the loosened vesture and carry away the objectionable foreign substances and leave the product in a cleanly and sweetened condition.

The apparatus herein shown has been devised for purifying grains—such as barley, oats, and the like—and the invention refers to means for treating the fumes prior to their entrance to the purifying-chamber and also to structural details of the said chamber. So far as the means for cooling the fumes is concerned the apparatus may be designed for purifying other substances, and in such case the structural details will be varied.

Figure 1:
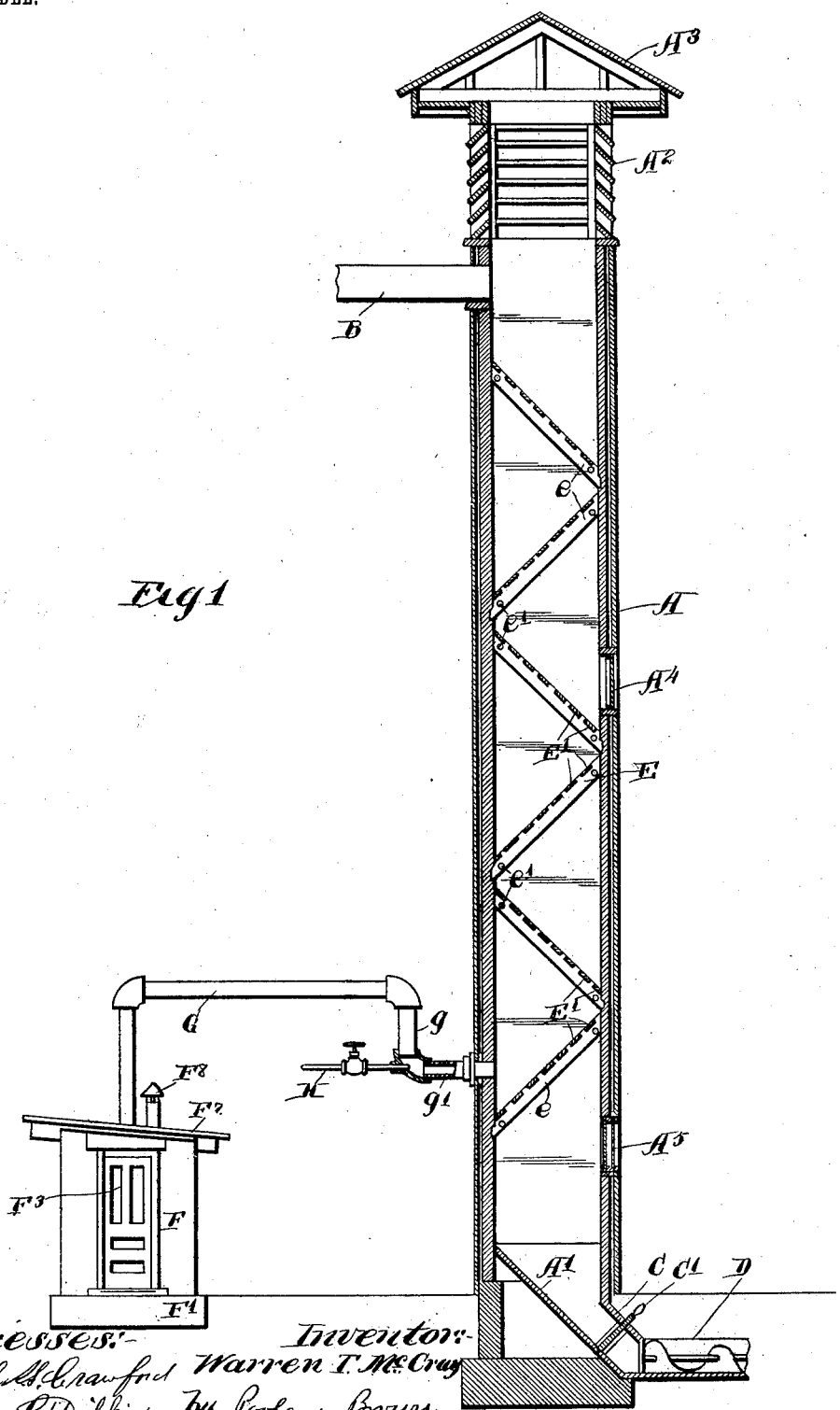
Figure 2:
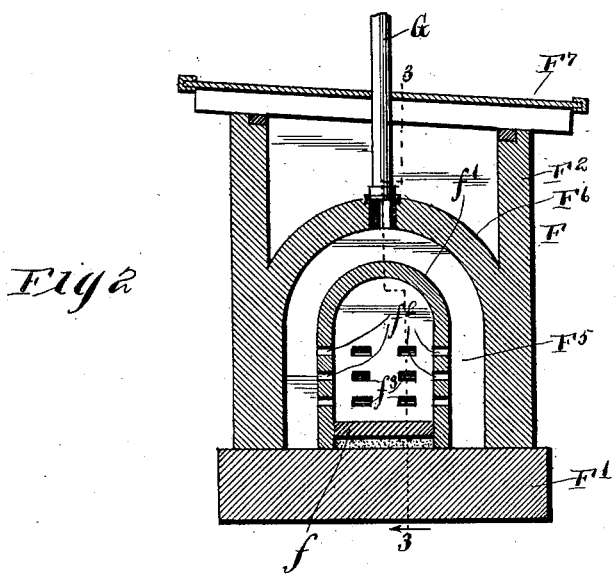
Figure 3:
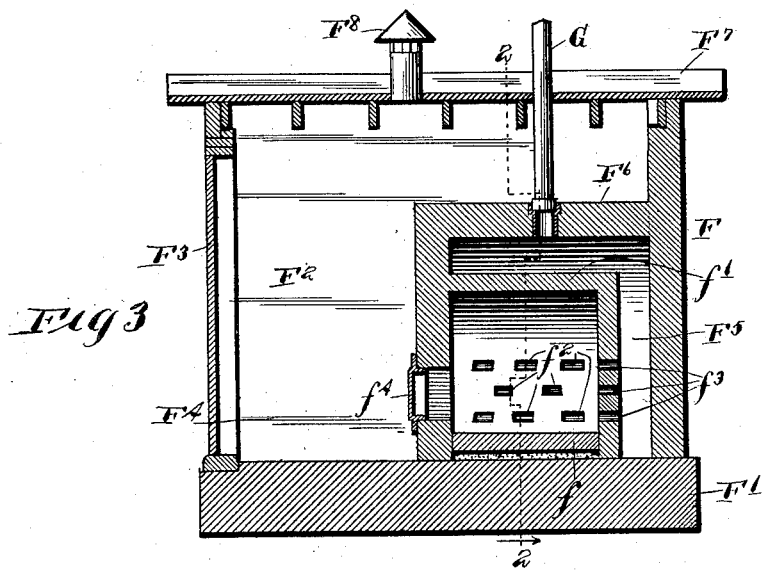

As shown in the drawings, Figure 1 is a view, partly in section and partly in elevation, of an apparatus embodying my improvements. Fig. 2 is a vertical section of a furnace for generating the purifying fumes, taken on line 2 2 of Fig. 3. Fig. 3 is a vertical section of said furnace, taken on line 3 3 of Fig. 2.

As shown in said drawings, A designates a vertically-elongated chamber having the appearance of a shaft and through which grain is adapted to pass from the upper to the lower end thereof. Said chamber is made of considerable height, being made from thirty to forty feet, depending upon the conditions in each instance. At the upper end of said chamber is a conveyer shell or spout B, which is adapted to lead from an elevator or other like place (not shown) and through which grain is delivered to the chamber. The lower end of said chamber is provided with an outlet chute or spout C, which communicates with the shell of a discharge-conveyer D, and the chamber is provided at its lower end with a deflecting-board A', which directs the grain to said chute. Said chute or spout is provided with a valve or gate C', by which the passage of grain therethrough is regulated. The chamber A is constructed at its upper end to provide a ventilator $A^2$, through which the fumes and steam may escape, and is provided above said ventilator with an overhanging roof $A^3$. Said chamber is provided interiorly thereof with means for retarding the descent of the grain therethrough, whereby the body of the grain in its passage or descent through the chamber is broken up and intimately exposed to the action of the fumes. Said retarding means consists of a plurality of inclined shelves arranged one above the other from the upper to the lower end of the chamber and inclined alternately in opposite directions at an angle of about forty-five degrees, as herein shown. Said shelves are made of open-work construction, permitting the grain to pass downwardly therethrough, and, as herein shown, consists of inclined end bars E', affixed to the side walls of the chamber, and transverse slats $e$, fitting at the ends thereof in upwardly-opening notches or recesses in the upper faces or margins of said bars. This construction enables the slats to be lifted out of the bars when it is desired to remove one or more of the shelves for the purpose of dislodging grain which may collect in any part of the chamber. Said slats need not be fastened to the bars by permanent fastening means, there being no tendency for the same to drop out of their places, and therefore may be readily removed when such removal is desired. The end bars of the shelves are fastened to the side walls of the chamber by wooden pins passing therethrough and into said walls and by tenons at the ends thereof which engage mortises in said end walls, it being undesirable to use metal fastening devices for these purposes because of the deteriorating action of the sulfur fumes thereon. The chamber is provided at one side thereof with a door $A^4$, which permits access to the chamber for the purpose of cleaning the chamber or other purpose. It is desirable that the gate or valve $C'$ be so regulated with respect to the inlet of the grain as to fill the bottom of the chamber with a body of grain for a height of five or six feet to prevent the fumes escaping into the discharge-conveyer. An inspection-window $A^5$ will also desirably be built in the wall of the chamber, near the base thereof, in order to readily determine the level of the grain in the chamber, whereby said level may be by the use of the valve $C'$ uniformly maintained.

F designates a furnace in which the fumes of the purifying agent are generated. Said furnace is shown in detail in Figs. 2 and 3 and consists of an elongated inclosure having a substantially rectangular floor $f$ and an arched roof $f'$. Said furnace is provided on its side and end walls with openings $f^2$ $f^3$, respectively, and is provided in its front wall with an opening closed by doors $f^4$, through which latter opening the sulfur or other purifying agent is adapted to be inserted into the furnace. Said furnace rests on a concrete foundation $F'$ and is surrounded by a housing or inclosure $F^2$, made of any suitable form and shown more clearly in Fig. 1. The housing is provided with a door $F^3$ and is constructed to provide in front of the furnace a storage-room $F^4$, which is entered through said door and in which the purifying agent is stored preparatory to burning. The furnace proper is surrounded at its sides, back, and top by a cooling-space $F^5$, said space being formed at the sides thereof between the furnace and the side wall of the housing, at the end between the furnace and the end wall of the housing, and at the top between the arched roof of the furnace and an arched wall $F^6$, extending over the furnace from one side wall to the other of the housing, as shown in Fig. 2. The interior of the furnace communicates with said cooling-chamber through the openings $f^2$ $f^3$, before mentioned. Said cooling-chamber communicates with the interior of the purifying-chamber A through the medium of the pipe G, which passes downwardly through the roof $F^7$ of the housing $F^2$ and through the arched wall of the cooling-chamber and communicates at its end remote from the furnace with the purifying-chamber adjacent to the base thereof. The housing is provided with a ventilator $F^8$, leading upwardly from the storage-chamber, as shown in Figs. 1 and 3. H designates a steam-pipe through which steam is introduced into the purifying-chamber for the purpose of dampening the grain. Said steam-pipe may receive steam from any suitable source, as from a generator (not shown) which supplies steam to the engines about the elevator plant.

In order to positively force the fumes from the furnace F through the pipe G into the purifying-chamber A, in the apparatus shown the steam-pipe H is made to enter the fume-pipe G at or near the entrance of said latter pipe to the chamber and acts as an injector to draw the fumes into the chamber. As herein shown, the fume-pipe G is provided near its entrance to the chamber with a downwardly-directed or offset portion $g$ and a short horizontal part $g'$, which enters the chamber, and the steam-pipe enters the horizontal part $g'$ thereof at its intersection with the vertical part $g$. So far as the features of improvement constituting the present invention are concerned it is obviously immaterial whether the fumes are directed into the purifying-chamber by the action of the steam or whether said agents enter the chamber through separate pipes.

In practicing my process by the use of the apparatus herein shown sulfur or other purifying agent is placed on the floor $f$ of the furnace F and ignited, and the fumes thereof pass from the furnace through the openings $f^2$ $f^3$ into the cooling-chamber $F^5$ and from thence through the pipe G into the chamber A, together with steam entering through the pipe H, said steam causing an inwardly-directed current, by which the fumes are forced into the chamber. The grain is passed continuously through the purifying-chamber A, being admitted at the top and discharged at the bottom thereof. Steam and fumes are admitted to the chamber A and act upon the grain therein to purify the same in the manner before described.

The cooling-chamber $F^5$ is made relatively large with respect to the discharge-openings leading to the fume-pipe G and to the aggregate area of the openings leading from the furnace F into the cooling-chamber, so that the speed or velocity of the fumes through said cooling-chamber is decreased or lessened. As a result a portion of the heat of the fumes while in said chamber is lost by radiation through the walls of the housing and the wall $F^6$, so that when the fumes enter the pipe G they are under a considerably less temperature than when escaping from the furnace. The fumes therefore enter the purifying-chamber at a relatively low temperature and at a temperature less than that of the steam entering through the pipe H. As a result of this operation the heat of the fumes does not tend to drive off the moisture from the steam entering through the pipe H, as would be true if the fumes were introduced directly into the purifying-chamber at their maximum temperature. Furthermore, the loss of heat from the fumes prior to their introduction into the purifying-chamber is advantageous, because of the fact that said fumes do not tend to drive off the moisture from the grain, as would be true if the fumes at the original temperature of generation were permitted to enter said chamber.

It is essential to a proper purification of grain by the process mentioned that a certain percentage of moisture be added to the grain after its introduction into the purifying apparatus, (the amount depending upon the condition of the grain and the quantity of moisture carried thereby when introduced into the apparatus,) as if the proper moistened condition of the grain be not maintained the fumes will have little or no effect toward removing the foreign substances therefrom. With my construction, therefore, the steam is permitted to enter the purifying-chamber without losing any of its moisture, so that the grain is moistened to the desired extent preparatory to the action of the fumes thereon, and the fumes being in a relatively cool state tend to more readily combine with the moisture upon the surface of the grain to produce sulfurous acid, and therefore the efficiency of the purifying agent is greatly increased over the process wherein the fumes are introduced into the purifying-chamber at their maximum temperature.

So far as the cooling of the fumes after they have passed from the furnace is concerned, it is obvious that such cooling may take place in a cooling-chamber entirely removed from the housing—as, for instance, a large storage-tank, into which the fumes pass from the furnace and from which said fumes are directed to the purifying-chambers. It is furthermore obvious that the fumes may be cooled by other means differing in details from those herein shown and suggested.

The construction and arrangement of the retarding devices in the purifying-chamber are of considerable importance, as owing to the inclination of the shelves and the arrangement of the slats or bars thereon the grain is permitted to pass freely therethrough, and at the same time the body of the grain is broken in such manner that the fumes and steam become intimately intermixed therewith and act uniformly on all parts of the grain. Another advantage of the particular construction shown is that the shelves may be readily removed in case such removal is desired, the door $A^4$ affording access to the interior of the chamber for the purpose of removing or repairing the shelves.

It is obvious that changes may be made in the structural details without departing from the spirit of my invention, and I do not wish to be limited thereto except as hereinafter made the subject of specific claims. For instance, other forms of dampening agent may be employed than steam and may be applied to the product in a manner differing from that herein shown.

I claim as my invention—

An apparatus for the purpose set forth, comprising a chamber through which the product to be purified is passed, a furnace in which the fumes are generated, walls surrounding the top, side walls and one end wall of the furnace and forming a cooling-chamber which communicates with the interior of the furnace by means of a plurality of openings formed in the side and end walls of the furnace, a pipe leading from the top of said cooling-chamber to the purifying-chamber and means for drawing the fumes through said pipe from the said cooling-chamber and forcing the same into the purifying-chamber.

In testimony that I claim the foregoing as my invention I affix my signature, in presence of two witnesses, this 27th day of July, A. D. 1901.

WARREN T. McCRAY.

Witnesses:
ADAH E. BUSH,
JOHN Z. JOHNSTON.